United States Patent Office 2,746,994
Patented May 22, 1956

2,746,994

PROCESS FOR THE PREPARATION OF DITHIO-DIALKYLENE GLYCOLS

Warren D. Helmer, Levittown, Pa., assignor to Thiokol Chemical Corporation, Trenton, N. J., a corporation of Delaware No Drawing. Application April 5, 1955, Serial No. 499,501

11 Claims. (Cl. 260—608)

This invention relates to the manufacture of dithiodialkylene glycols which are useful in the production of polysulfide polymers and more particularly to a novel and improved method of making such glycols.

Polysulfide polymers have been used extensively for a wide variety of purposes such as linings for gasoline and oil hose, protective jackets for high tension wires, printing rollers and blankets, gaskets, washers, diaphragms for regulators, packings for compressors, caulking and sealing agents, and for many other purposes. While such polysulfide polymers can be made in any of a variety of ways, one way of making the polymers involves the condensation of dithiodialkylene glycols with formaldehyde.

The dithiodialkylene glycols produced by the present process may be substituted or unsubstituted bis-(beta-hydroxy ethyl) disulfides and may be represented by the general formula:

$$(HO-\overset{R}{\underset{R}{C}}-\overset{R}{\underset{R}{C}}-)_2 S_2$$

wherein R is hydrogen or an alkyl or aryl group. The commonest and most important species has the formula:

$$(HOCH_2CH_2)_2S_2$$

and may be termed simply dithiodiglycol.

While dithiodialkylene glycols generally and dithiodiethylene glycol in particular have been prepared by methods heretofore proposed in the art, these methods leave much to be desired from the standpoint of the purity and yield of the product obtained, the availability and toxicity of the initial reactants, the reaction conditions, and the by-products obtained. Thus, for example, a method involving the reaction of a chlorhydrin with an alkaline sulfide has the disadvantage of being uneconomical in the use of expensive initial reactants and in the preparation of a by-product as inexpensive as ordinary salt. Other methods heretofore proposed have the disadvantages of employing toxic reactants such as hydrogen sulfide, producing by-products which are neither valuable nor readily capable of regeneration for use in the process, and of providing relatively poor yields of inferior purity.

The surprising discovery has now been made that dithiodialkylene glycols of superior color and purity can readily be prepared from inexpensive and readily available initial reactants and in excellent yields. In accordance with the method of the invention, an alkylene oxide is reacted, in an aqueous solution, with an alkaline thiosulfate, a water-soluble alkaline monosulfide and a water-soluble acidic material.

While it is to be understood that the invention is not to be limited by any theory advanced in this description, there is good reason to believe that the alkylene oxide first reacts with the thiosulfate and water to form the corresponding hydroxy alkylene thiosulfate and alkaline hydroxide and that the latter is neutralized by the acid to form a mol of sulfite. The hydroxy alkylene thiosulfate is then capable of conversion to the dithiodialkylene glycol by reaction with the alkaline sulfide. This sequence of events, as applied for illustrative purposes specifically to ethylene oxide, sodium thiosulfate, sulfur dioxide or sulfurous acid, and sodium monosulfide, may be represented by the following reactions:

(A)

$$2CH_2CH_2\underset{O}{\diagdown\diagup} + 2Na_2S_2O_3 + 2H_2O = 2NaS_2O_3CH_2CH_2OH + 2NaOH$$

(B) $\quad\quad\quad 2NaOH + SO_2 = H_2O + Na_2SO_3$ (C)

$$2NaS_2O_3C_2H_4OH + Na_2S = (HOC_2H_4)_2S_2 + Na_2S_2O_3 + Na_2SO_3$$

Alkylene oxides in general can be used in the method of the invention. Ethylene oxide is the preferred alkylene oxide because of its availability and relatively lower cost. However, numerous other alkylene oxides can be used and examples of these are illustrated by formulae as follows:

$$CH_2CHCH_3\underset{O}{\diagdown\diagup}$$

$$CH_2CHCH_2CH_3\underset{O}{\diagdown\diagup}$$

$$CH_2CHCH_2CH_2CH_3\underset{O}{\diagdown\diagup}$$

$$CH_2CHCH_2CH_2CH_2CH_3\underset{O}{\diagdown\diagup}$$

$$CH_2CH=CH_2\underset{O}{\diagdown\diagup}$$

$$CH_3CH_2CHCHCH_3\underset{O}{\diagdown\diagup}$$

$$\langle\underset{}{\bigcirc}\rangle-CHCH_2\underset{O}{\diagdown\diagup}$$

$$\langle\underset{}{\bigcirc}\rangle-CH_2CHCH_2\underset{O}{\diagdown\diagup}$$

$$\langle\underset{}{\bigcirc}\rangle-CHCH-\langle\underset{}{\bigcirc}\rangle\underset{O}{\diagdown\diagup}$$

$$\langle\underset{}{\bigcirc}\rangle-CH_2CHCHCH_2-\langle\underset{}{\bigcirc}\rangle\underset{O}{\diagdown\diagup}$$

All of the above compounds can be regarded as alkylene oxides because the alkylene oxide group (as such or substituted) is common to all.

The thiosulfate and monosulfide used as reactants are referred to generically as the alkaline thiosulfates and sulfides and include the water-soluble thiosulfates and sulfides of alkali- and alkaline earth metals and ammonium thiosulfates and sulfides. Sodium thiosulfate and sodium monosulfide are preferred at present because they are the least expensive and most readily available.

The thiosulfate is reduced to the corresponding sulfite in the course of the reaction and is believed to be in large part responsible for the excellent yields and quality obtainable by the method of the invention. The sulfite formed as a by-product of the reaction may readily be regenerated to the initial thiosulfate by reaction with elemental sulfur. This can be accomplished in a separate step or in situ by adding a sufficient amount of elemental sulfur to the reaction mixture.

The water-soluble acidic material may be in the gaseous, liquid or solid form. Included among the suitable acidic materials in the gaseous form are sulfur dioxide, sulfur trioxide, carbon dioxide, hydrogen chloride or hydrogen bromide. Suitable acidic materials in the liquid form are the aqueous forms of the foregoing materials, i. e., sulfurous, sulfuric, carbonic, hydrochloric and hydrobromic acids, or other liquid acids such as nitric, phosphoric or acetic acids. Solid water-soluble acidic materials that are suitable include boric acid, sodium bicarbonate, sodium orthophosphite, sodium acid sulfite, sodium hydrosulfide, acetic acid and the like. The preferred acidic material is sulfur dioxide since it reacts with the alkali formed as an incident of the reaction to form the corresponding sulfite which, as already indicated, is readily convertible to the thiosulfate with free sulfur.

It will readily be appreciated of course that if an acid material having only one hydrogen ion, e. g., acetic acid, is utilized to neutralize the alkaline hydroxide, then two mols thereof must be utilized instead of the one mol of $SO_2$ shown in equation "B" above to form the corresponding sodium salt, e. g., sodium acetate.

In one preferred embodiment of the method of the invention, the alkylene oxide is gradually introduced, by bubbling if it is a gas, into a concentrated aqueous solution of the thiosulfate. The acidic material may be added intermittently or continuously. The pH of the reactants is not particularly critical because there is no danger of forming mercaptans at low pH, although very high pH's should be avoided to inhibit or at least minimize formation of alkylene glycol or glycollate. Generally, it is preferable to add sufficient acid material to substantially neutralize the alkaline hydroxide formed by the reaction of the alkylene oxide with the thiosulfate. The alkaline monosulfide may be added at any time, even after completion of the reaction between the oxide and the thiosulfate, as will become evident by a reduction or leveling off of the temperature of the reactants, said temperature generally rising from room temperature to about 45 or 50° C., depending upon the rapidity with which the alkylene oxide is added and the degree of stirring and cooling. The dithiodiglycol generally separates as a white or light colored layer which can readily be separated.

In another preferred embodiment of the invention, the method is made continuous by introducing, continuously or intermittently, the alkylene oxide, acidic material, monosulfide and sulfur into an aqueous thiosulfate solution. In this embodiment, the sulfur combines with the sulfite formed as a by-product to regenerate the thiosulfate and has the advantage of producing still higher yields of dithiodialkylene glycol because of the saturation of the thiosulfate solution therewith.

The advantages of the method of the invention are numerous and important. Significant among these are the non-toxic or comparatively non-toxic nature of the reactants, the lesser tendency to form mercaptan impurities of objectionable odor and color, the purity of the dithiodialkylene glycols obtained and the ready availability of the reactants. The use of sulfur dioxide or sulfurous acid in the method has the further advantage of producing two mols of sulfite, a most useful by-product, per mol of thiosulfate used.

These and other advantages, as well as the utility of the method of the invention will become further apparent from the detailed description in the following examples which are included for illustrative purposes only as showing the best modes at present contemplated for carrying out the invention.

*Example 1*

1116 grams of $Na_2S_2O_3 \cdot 5H_2O$ (4.5 mols) and 1116 grams water were placed in a three liter reaction flask with indented sides and fitted with agitator, thermometer and condenser. After the thiosulfate was dissolved, ethylene oxide and sulfur dioxide were introduced below the liquid surface by means of fritted glass sparger tubes. Rapid agitation was maintained and the temperature was controlled to 30–45° C. The gas addition rates were adjusted to keep the pH of the solution at about 9.

After 45 minutes the pH was adjusted first to 6 and then to 9–10 and the feeds of ethylene oxide and sulfur dioxide were stopped. Cylinder weights showed 3.39 mols of ethylene oxide and 1.45 mols $SO_2$ had been added. Then 1.7 mols of 60% flake $Na_2S$ were added to the stirred solution, which turned an opaque white almost immediately. The temperature rose from 32° C. to 45° C. The mixture was then transferred to a separatory funnel where a practically white layer of dithiodiethylene glycol rose to the top. This was separated, the pH was adjusted to 4 with $H_2SO_4$, and dried by subjecting it to aspirator vacuum for 3–4 hours at 95–100° C. and filtered.

81.3 grams of dithiodiethylene glycol were recovered. It was a moderately thin liquid having a mild odor and had a pale yellow color. The following data were obtained:

| | Found | Theory |
|---|---|---|
| OH _____ percent__ | 22.5 | 23.4 |
| Sulfur _____ do____ | 43.0 | 41.6 |
| SH _____ do____ | 0.68 | 0 |
| $n_D^{20°}$ C _____ | 1.5652 | 1.5645 |
| Hellige Color _____ | 2 | 0 |
| Water Miscibility _____ | (¹) | (¹) |

¹ All proportions, no cloudiness.

*Example 2*

1190 grams (5.0 mols) of $Na_2S_2O_3 \cdot 5H_2O$ and 795 grams of water were placed into a two liter reaction flask. Ethylene oxide was bubbled into this solution for two hours and 15 minutes while good agitation was maintained. The temperature rose to 45° C. From time to time the pH was adjusted to 7 by the addition of glacial acetic acid, the total amount of acetic acid used being 267 grams (4.35 mols.) With the pH at seven, 283 grams of flake 60% $Na_2S$ were added. The resulting wet oil layer was adjusted to a pH of 4 and dried under aspirator vacuum in a steam bath.

118.2 grams of dithiodiethylene glycol were obtained. An analysis thereof showed 20.0% OH and 40.7% S.

*Example 3*

1190 grams (5.0 mols) of $Na_2S_2O_3 \cdot 5H_2O$ and 795 grams of water were placed into a two liter reaction flask. 385 grams (8.75 mols) ethylene oxide were bubbled into the solution through a fritted glass sparger tube, some of the ethylene oxide being lost because of excessive addition rate. The pH was periodically adjusted to 7 with 37% HCl solution, a total of 300 ml. of acid (3.61 mols) being added. With the pH at seven, 234 grams (1.8 mols) 60% $Na_2S$ were added. The resulting oil layer was separated, dried under aspirator vacuum in a boiling water bath and filtered.

36.9 grams of dithiodiethylene glycol were recovered. An analysis thereof showed 20.4% OH and 38.95% S.

*Example 4*

1190 grams (5.0 mols) $Na_2SO_3.5H_2O$, 160 grams (2 mols) of 70% NaSH and 795 grams of water were charged to a two liter flask. 69 grams (1.57 mols) of ethylene oxide were bubbled in through a fritted glass sparger tube. At this point the solution did not discolor lead acetate test paper. The pH was then adjusted to 5 with concentrated $H_2SO_4$. The oil layer which separated was dried under aspirator vacuum in a boiling water bath and filtered. 17.2 grams of dithiodiethylene glycol were recovered. An analysis thereof showed 22.0% OH and 39.6% S.

It is apparent that many modifications will become apparent to those skilled in the art upon reading this description. All such modifications are intended to be

I claim:

1. The method of making a dithiodialkylene glycol which comprises reacting an alkylene oxide, in an aqueous solution, with an alkaline thiosulfate, a water-soluble alkaline monosulfide, and sufficient water-soluble acidic material for substantially neutralizing the alkaline hydroxide formed in the reaction.

2. The method of making a dithiodialkylene glycol which comprises reacting an alkylene oxide, in an aqueous solution, with an alkaline thiosulfate, a water-soluble alkaline monosulfide, and sufficient water-soluble acidic material for substantially neutralizing the alkaline hydroxide formed in the reaction, thereby forming dithiodialkylene glycol and an alkaline sulfite, separating the dithiodialkylene glycol, and regenerating the alkaline sulfite by reaction with elemental sulfur.

3. The method of making a dithiodialkylene glycol which comprises introducing an alkylene oxide, a water-soluble alkaline monosulfide, and sufficient water-soluble acidic material into an aqueous solution of an alkaline thiosulfate for substantially neutralizing the alkaline hydroxide formed in the reaction.

4. The method of making a dithiodialkylene glycol which comprises continuously introducing an alkylene oxide, a water-soluble acidic material, a water-soluble alkaline monosulfide and elemental sulfur into an aqueous solution of an alkaline thiosulfate.

5. The method of making a dithiodialkylene glycol which comprises introducing an alkylene oxide and a water-soluble acidic material into an aqueous solution of an alkaline thiosulfate and then adding a water-soluble alkaline monosulfide for forming dithiodialkylene glycol and an alkaline sulfite.

6. The method of making dithiodiethylene glycol which comprises reacting ethylene oxide, in an aqueous solution, with an alkaline thiosulfate, a water-soluble alkaline monosulfide, and a water-soluble acidic material.

7. The method of making dithiodiethylene glycol which comprises bubbling ethylene oxide into an aqueous solution of sodium thiosulfate, adding a water-soluble acidic material to the reaction mixture, and further adding sodium monosulfide to the reaction mixture for forming dithiodiethylene glycol and sodium sulfite.

8. The method of making dithiodiethylene glycol which comprises bubbling ethylene oxide and $SO_2$ into an aqueous solution of sodium thiosulfate, and adding sodium monosulfide to the reaction mixture.

9. The method of making a dithiodialkylene glycol which comprises reacting an alkylene oxide, in an aqueous solution, with an alkaline thiosulfate, a water-soluble alkaline monosulfide, and sufficient sulfur dioxide for substantially neutralizing the alkaline hydroxide formed in the reaction.

10. The method of making a dithiodialkylene glycol which comprises continuously introducing an alkylene oxide, sulfur dioxide, a water-soluble alkaline monosulfide and elemental sulfur into an aqueous solution of an alkaline thiosulfate.

11. The method of making a dithiodialkylene glycol which comprises introducing an alkylene oxide, a water-soluble alkaline monosulfide, and sufficient sulfur dioxide into an aqueous solution of an alkaline thiosulfate for substantially neutralizing the alkaline hydroxide formed in the reaction.

No reference cited.